United States Patent
Kitagawa et al.

(10) Patent No.: US 11,328,439 B2
(45) Date of Patent: May 10, 2022

(54) INFORMATION PROCESSING DEVICE, OBJECT MEASUREMENT SYSTEM, OBJECT MEASUREMENT METHOD, AND PROGRAM STORAGE MEDIUM

(71) Applicant: NEC Corporation, Tokyo (JP)

(72) Inventors: Takeharu Kitagawa, Tokyo (JP); Jun Piao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/971,078

(22) PCT Filed: Mar. 7, 2019

(86) PCT No.: PCT/JP2019/009045
§ 371 (c)(1),
(2) Date: Aug. 19, 2020

(87) PCT Pub. No.: WO2019/172363
PCT Pub. Date: Sep. 12, 2019

(65) Prior Publication Data
US 2020/0394811 A1    Dec. 17, 2020

(30) Foreign Application Priority Data

Mar. 9, 2018 (JP) .............................. JP2018-043236

(51) Int. Cl.
*G06T 7/60* (2017.01)
*A01K 61/95* (2017.01)
*H04N 5/247* (2006.01)

(52) U.S. Cl.
CPC ................ *G06T 7/60* (2013.01); *A01K 61/95* (2017.01); *G06T 2207/20081* (2013.01); *H04N 5/247* (2013.01)

(58) Field of Classification Search
CPC . G06T 7/60; G06T 2207/20081; A01K 61/95; H04N 5/247
(Continued)

(56) References Cited

U.S. PATENT DOCUMENTS 6,650,778 B1    11/2003 Matsugu et al.
2019/0244346 A1 *  8/2019 Schafer .................... G06T 7/155

FOREIGN PATENT DOCUMENTS

JP    2000125319 A  *  4/2000
JP    2000-215319 A     8/2000
(Continued)

OTHER PUBLICATIONS

International Search Report for PCT Application No. PCT/JP2019/009045, dated May 21, 2019.
(Continued)

*Primary Examiner* — Wednel Cadeau

(57) ABSTRACT

An information processing device includes a detection unit and a calculation unit. The detection unit detects, as a measurement use point, a portion that is used for prescribed length measurement of the object, in each of sectioned regions, in an object image included in the photographed image, set on both sides with respect to a reference line which is set for the object image and by which the object image is sectioned. The calculation unit calculates the length of a segment, in each of the sectioned regions, between the measurement use point and the intersection point between the reference line and a perpendicular line passing through the measurement use point and being perpendicular to the reference line. Further, the calculation unit calculates a length, in the object, to be measured, by adding together the calculated lengths of the segments.

10 Claims, 13 Drawing Sheets

(58) Field of Classification Search
USPC .......................................................... 382/110
See application file for complete search history.

(56) References Cited

FOREIGN PATENT DOCUMENTS

| | | | |
|---|---|---|---|
| JP | 2003-250382 A | 9/2003 | |
| JP | 2013-201714 A | 10/2013 | |
| WO | 2009/008733 A1 | 1/2009 | |
| WO | 2016/092646 A1 | 6/2016 | |
| WO | WO-2016092646 A1 * | 6/2016 | ............... G06T 7/00 |
| WO | 2017/204660 A1 | 11/2017 | |

OTHER PUBLICATIONS

English translation of Written opinion for PCT Application No. PCT/JP2019/009045, dated May 21, 2019.
Japanese Office Communication for JP Application No. 2020-505103 dated Nov. 24, 2021 with English Translation.

* cited by examiner

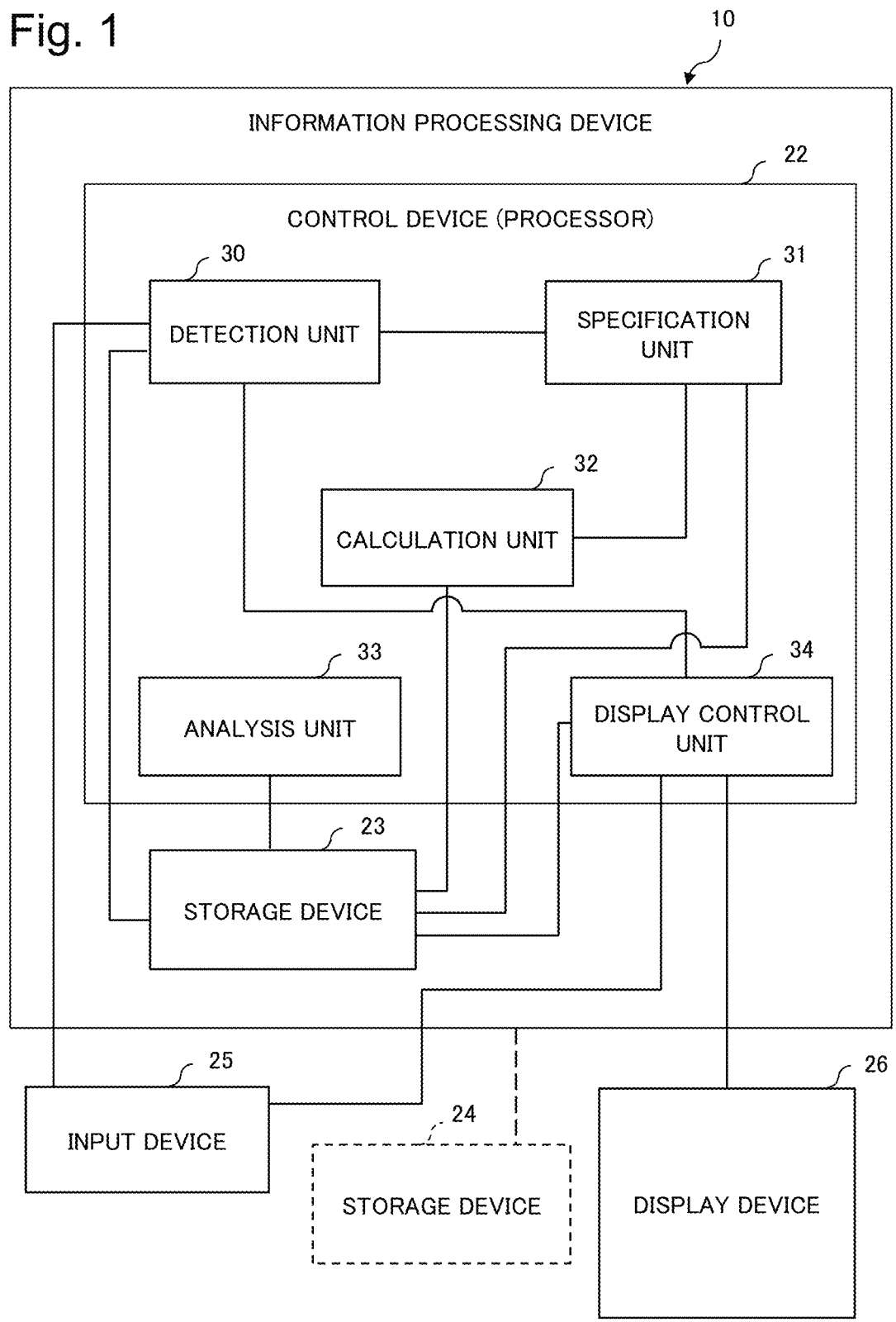

INFORMATION PROCESSING DEVICE, OBJECT MEASUREMENT SYSTEM, OBJECT MEASUREMENT METHOD, AND PROGRAM STORAGE MEDIUM

This application is a National Stage Entry of PCT/JP2019/009045 filed on Mar. 7, 2019, which claims priority from Japanese Patent Application 2018-043236 filed on Mar. 9, 2018, the contents of all of which are incorporated herein by reference, in their entirety.

TECHNICAL FIELD

The present invention relates to a technology for measuring, from a captured image in which an object to be measured is captured, a length and the like of the object.

BACKGROUND ART

For the purpose of improvement of cultivation technology of fish, observation of growth of cultivated fish has been performed. PTL 1 discloses a technology relating to observation of fish. In the technology in PTL 1, shapes and sizes of regions, such as a head, a body, and a caudal fin, of a fish are estimated with respect to each region, based on captured images of a back side (or an abdomen side) of a fish captured from an upper side (or a bottom side) and a side of an aquarium and a captured image of a head side captured from the front. The estimation of the shape and size of each region of the fish is performed by use of a plurality of template images provided for each region. Specifically, captured images of each region are individually compared with template images of each region, and, based on known information of sizes and the like of regions of a fish in template images that match the captured images, the size and the like of each region of the fish are estimated.

PTL 2 discloses a technology of capturing images of fish in water by use of a video camera and a still-image camera and detecting a fish shadow, based on captured video and still images. PTL 2 also describes a configuration for estimating a size of a fish, based on a size of an image (the number of pixels).

CITATION LIST

Patent Literature

[PTL 1] Japanese Unexamined Patent Application Publication No. 2003-250382
[PTL 2] Japanese Unexamined Patent Application Publication No. 2013-201714

SUMMARY OF INVENTION

Technical Problem

In the technology described in PTL 1, a size of a region of a fish is estimated based on known size information on a region of a fish in the template image. In other words, since the technology in PTL 1 merely detects a size of a region of a fish in a template image as the size of the region of a fish to be measured and does not measure a size of the region of the fish to be measured, a problem may occur that it is difficult to increase detection accuracy of the size.

Although, in PTL 2, a configuration for detecting a size of an image (the number of pixels) as a size of a fish shadow is described, no configuration for detecting an actual size of a fish is disclosed.

The present invention has been made in order to solve the above-described problems. Specifically, a principal object of the present invention is to provide a technology that is capable of increasing accuracy of measurement values acquired by measuring a length and the like of an object to be measured, based on a captured image.

Solution to Problem

In order to achieve the above-described object, an information processing device as one example embodiment according to the present invention includes:
a detection unit that, when an object image is divided by a baseline, detects a predetermined portion of an object to be measured as a measurement-use point in each of divided areas on both sides of the baseline in the object image, the object image being an image of the object in a captured image in which the object is captured, the baseline being set to the object image, the predetermined portion being a portion to be used for length measurement; and
a calculation unit that calculates, in each of the divided areas, a length of a line segment between an intersection point of a perpendicular that passes through the measurement-use point and is perpendicular to the baseline and the baseline and the measurement-use point, and calculates a length to be measured on the object by adding the lengths of the line segments each of which is calculated in one of the divided areas.

An object measurement system as another example embodiment according to the present invention includes:
an image capturing device that captures an image of an object to be measured; and
an information processing device that calculates, by use of a captured image captured by the image capturing device, a length to be measured on the object to be measured.

The information processing device includes:
a detection unit that, when an object image is divided by a baseline, detects a predetermined portion of an object to be measured as a measurement-use point in each of divided areas on both sides of the baseline in the object image, the object image being an image of the object in a captured image in which the object is captured, the baseline being set to the object image, the predetermined portion being a portion to be used for length measurement; and
a calculation unit that calculates, in each of the divided areas, a length of a line segment between an intersection point of a perpendicular that passes through the measurement-use point and is perpendicular to the baseline and the baseline and the measurement-use point, and calculates a length to be measured on the object by adding the lengths of the line segments each of which is calculated in one of the divided areas.

An object measurement method as still another example embodiment according to the present invention includes by a computer:
when an object image is divided by a baseline, detecting a predetermined portion of an object to be measured as a measurement-use point in each of divided areas on both sides of the baseline in the object image, the object image being an image of the object in a captured image in which the object is captured, the baseline being set to the object image, the predetermined portion being a portion to be used for length measurement;
calculating, in each of the divided areas, a length of a line segment between an intersection point of a perpendicular that passes through the measurement-use point and is perpendicular to the baseline and the baseline and the measurement-use point; and calculating a length to be measured on the object by adding the lengths of the line segments each of which is calculated in one of the divided areas.

A program storage medium as still another example embodiment according to the present invention stores a computer program causing a computer to perform:

when an object image is divided by a baseline, detecting a predetermined portion of an object to be measured as a measurement-use point in each of divided areas on both sides of the baseline in the object image, the object image being an image of the object in a captured image in which the object is captured, the baseline being set to the object image, the predetermined portion being a portion to be used for length measurement;

calculating, in each of the divided areas, a length of a line segment between an intersection point of a perpendicular that passes through the measurement-use point and is perpendicular to the baseline and the baseline and the measurement-use point; and calculating a length to be measured on the object by adding the lengths of the line segments each of which is calculated in one of the divided areas.

Advantageous Effects of Invention

The present invention enables accuracy of measurement values acquired by measuring a length and the like of an object to be measured, based on a captured image, to be increased.

BRIEF DESCRIPTION OF DRAWINGS

FIG. 1 is a block diagram illustrating a configuration of an information processing device of a first example embodiment according to the present invention in a simplified manner;

EXAMPLE EMBODIMENT

Example embodiments according to the present invention will be described below with reference to the drawings.

First Example Embodiment

Figure 2A:
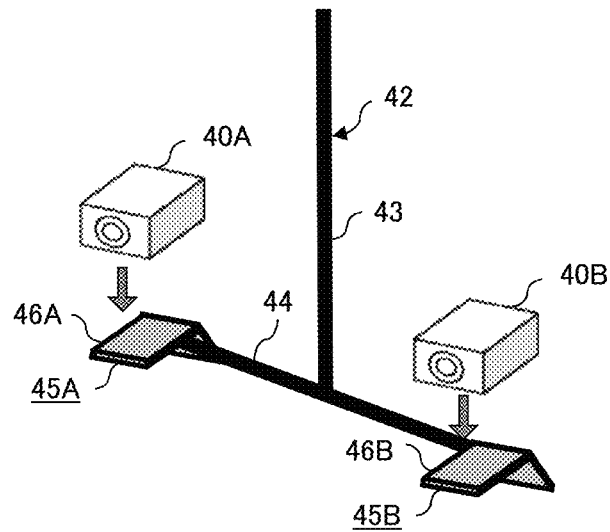
FIG. 2A is a diagram describing a configuration of an image capturing device that provides the information processing device of the first example embodiment with captured images.

FIG. 1 is a block diagram illustrating a configuration of an information processing device of a first example embodiment according to the present invention in a simplified manner. An information processing device 10 of the first example embodiment has a function of calculating lengths (fork length and body depth) of a fish that is an object to be measured from captured images of the fish that were captured by a plurality of (two) cameras 40A and 40B as illustrated in FIG. 2A and further estimating the weight of the fish. The information processing device 10 constitutes, in conjunction with the cameras 40A and 40B, a fish measurement system that is an object measurement system.

Although, in the first example embodiment, the cameras 40A and 40B are image capturing devices having a function of capturing a video, an image capturing device that, instead of having a video capturing function, for example, intermittently captures still images at each preset time interval may be employed as the cameras 40A and 40B.

Figure 2B:
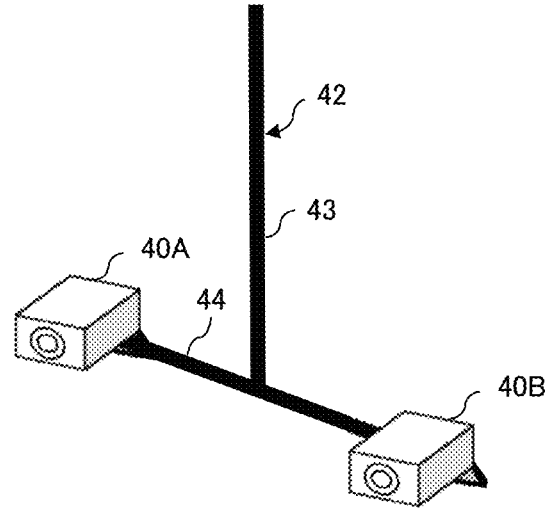
FIG. 2B is a perspective view illustrating the image capturing device that provides the information processing device of the first example embodiment with captured images.

Herein, the cameras 40A and 40B capture images of fishes while being placed side by side with an interval interposed therebetween, as illustrated in FIG. 2B, by being supported by and fixed to a support member 42 as illustrated in FIG. 2A. The support member 42 is constituted including an extensible rod 43, an attachment rod 44, and attachment fixtures 45A and 45B. In this example, the extensible rod 43 is a freely extensible and retractable rod member and further includes a structure that enables the length thereof to be fixed at a length appropriate for use within a length range in which the extensible rod 43 is extensible and retractable. The attachment rod 44 is made of a metallic material, such as aluminum, and is joined to the extensible rod 43 in such a way as to be orthogonal to the extensible rod 43. To the attachment rod 44, the attachment fixtures 45A and 45B are fixed at sites that are symmetrically located with respect to the joint portion with the extensible rod 43. The attachment fixtures 45A and 45B include mounting surfaces 46A and 46B and have a structure that enables the cameras 40A and 40B mounted on the mounting surfaces 46A and 46B to be fixed to the mounting surfaces 46A and 46B by means of, for example, screws without backlash, respectively.

The cameras 40A and 40B are capable of maintaining a state of being placed side by side with a preset interval interposed therebetween by being fixed to the support member 42 having a structure as described above. In the first example embodiment, the cameras 40A and 40B are fixed to the support member 42 in such a way that lenses disposed to the cameras 40A and 40B face the same direction and the optical axes of the lenses are set to be parallel with each other. The support member supporting and fixing the cameras 40A and 40B is not limited to the support member 42 illustrated in FIG. 2A and the like. For example, the support member supporting and fixing the cameras 40A and 40B may have, in place of the extensible rod 43 in the support member 42, a structure in which one or a plurality of ropes are used and the attachment rod 44 and the attachment fixtures 45A and 45B are suspended by the ropes.

Figure 3:
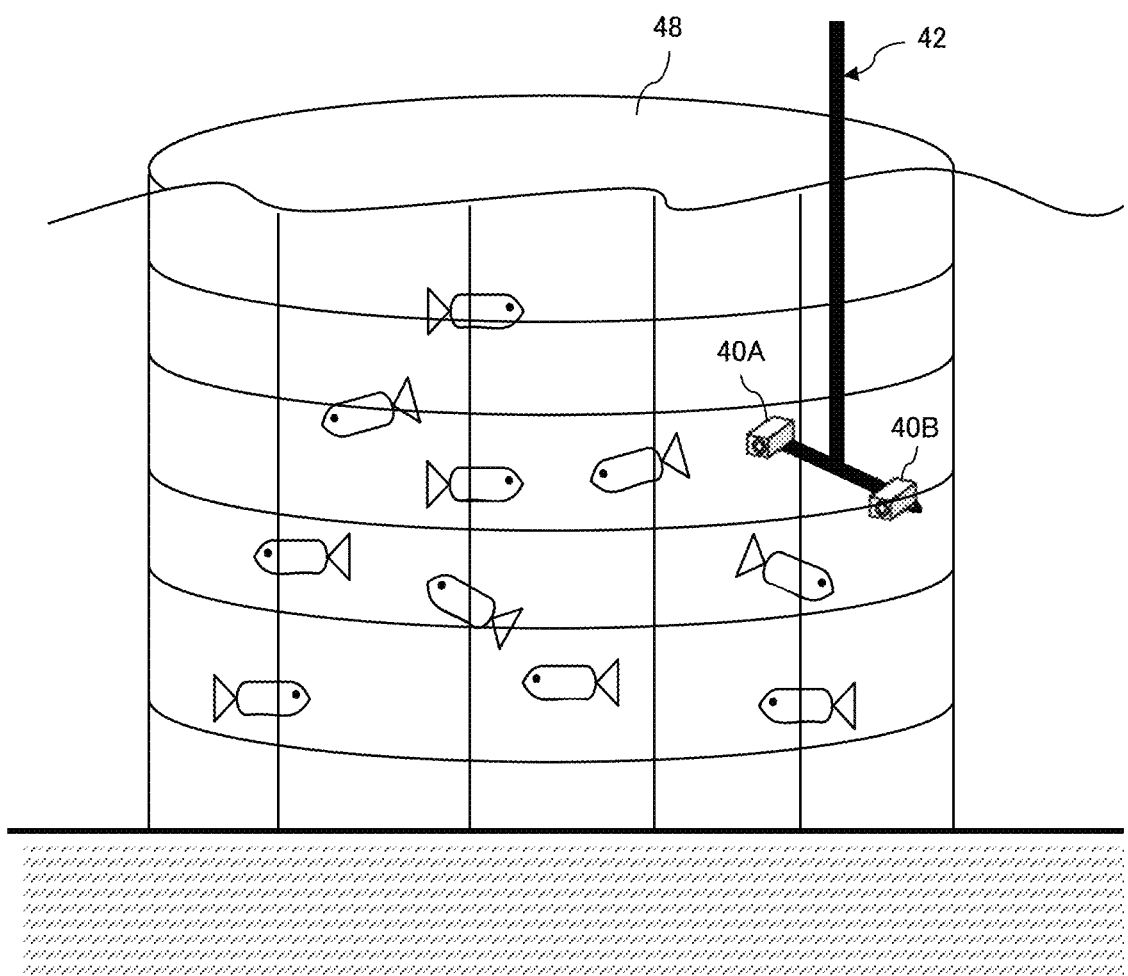
FIG. 3 is a diagram describing a mode in which the image capturing device captures images of fishes that are objects to be measured in the first example embodiment.

The cameras 40A and 40B, while being fixed to the support member 42, are, for example, made to enter a fish preserve 48 in which fishes are cultivated, as illustrated in FIG. 3 and arranged at a depth in the water and with a direction of the lenses that are determined to be appropriate for observation of fishes (in other words, image-capturing of fishes that are objects to be measured). As a method of arranging and fixing the support member 42 (the cameras 40A and 40B), which is made to enter the fish preserve 48, at an appropriate depth in the water and with an appropriate direction of the lenses, various methods are conceivable, and, herein, any method can be employed and a description of the method will be omitted. Calibration of the cameras 40A and 40B is performed using an appropriate calibration method selected in consideration of the environment of the fish preserve 48 and the types of fishes to be measured. A description of the calibration method will be omitted herein.

Further, as a method for starting image-capturing by the cameras 40A and 40B and stopping the image-capturing, an appropriate method selected in consideration of the performance of the cameras 40A and 40B, the environment of the fish preserve 48, and the like is employed. For example, an observer (measurer) of fishes manually starts image-capturing before making the cameras 40A and 40B enter the fish preserve 48 and manually stops the image-capturing after having made the cameras 40A and 40B leave the fish preserve 48. When the cameras 40A and 40B are equipped with the function of wireless communication or wired communication, an operation device that is capable of transmitting information for controlling image-capturing start and image-capturing stop is connected to the cameras 40A and 40B. The image-capturing start and the image-capturing stop may be controlled by the measurer operating the operation device.

A monitor device that is capable of receiving images that either or both of the camera 40A and the camera 40B is/are capturing from the cameras 40A and 40B by means of wired communication or wireless communication may be used. In this case, the measurer becomes able to see, through the monitor device, images being captured. This configuration, for example, enables the measurer to change the image-capturing direction or the depth in the water of the cameras 40A and 40B while seeing images being captured. A mobile terminal provided with a monitoring function may be used as the monitor device.

The information processing device 10 uses, in the processing of calculating lengths (herein, fork length and body depth) of a fish, a captured image from the camera 40A and a captured image from the camera 40B that were captured at the same time. In consideration of this requirement, in order to facilitate acquiring an image captured by the camera 40A and an image captured by the camera 40B that were captured at the same time, it is preferable to make the cameras 40A and 40B, while capturing images, also capture changes that serve as marks to be used in time alignment. For example, it may be configured such that, as marks to be used in time alignment, light that is emitted for a short period of time by means of automatic control or manually by the measurer is to be used and the cameras 40A and 40B capture the light. This configuration enables time alignment (synchronization) between an image captured by the camera 40A and an image captured by the camera 40B, based on the light captured in the images captured by the cameras 40A and 40B to be facilitated.

The above-described images captured by the cameras 40A and 40B may be taken into the information processing device 10 by means of wired communication or wireless communication or may, after having been stored in a portable storage medium (for example, a secure digital (SD) card), be taken into the information processing device 10.

The information processing device 10, when outlined, includes a control device 22 and a storage device 23, as illustrated in FIG. 1. The information processing device 10 is connected to an input device (for example, a keyboard or a mouse) 25 for inputting information to the information processing device 10 through, for example, operation by the measurer and a display device 26 for displaying information. Further, the information processing device 10 may be connected to an external storage device 24, which is a separate entity from the information processing device 10.

The storage device 23 has a function of storing various types of data and computer programs (hereinafter, also referred to as programs) and is achieved by a storage medium, such as a hard disk device and a semiconductor memory. The number of storage devices with which the information processing device 10 is provided is not limited to one and the information processing device 10 may be provided with a plurality of types of storage devices, and, in this case, the plurality of storage devices are collectively referred to as storage devices 23. The storage device 24 also has, as with the storage device 23, a function of storing various types of data and computer programs and is achieved by a storage medium, such as a hard disk device and a semiconductor memory. When the information processing device 10 is connected to the storage device 24, appropriate information is stored in the storage device 24. Although, in this case, the information processing device 10 appropriately performs processing of writing and reading information to and from the storage device 24, a description about the storage device 24 will be omitted in the following description.

In the first example embodiment, images captured by the cameras 40A and 40B are stored in the storage device 23 in association with identification information for identifying a camera that captured each image and information relating to an image-capturing situation, such as information of a capture time.

The control device 22 is constituted by a processor, such as a central processing unit (CPU) and a graphics processing unit (GPU). The control device 22 is capable of having functions as follows by, for example, the CPU executing computer programs stored in the storage device 23. That is, the control device 22 includes, as functional units, a detection unit 30, a specification unit 31, a calculation unit 32, an analysis unit 33, and a display control unit 34.

Figure 4:
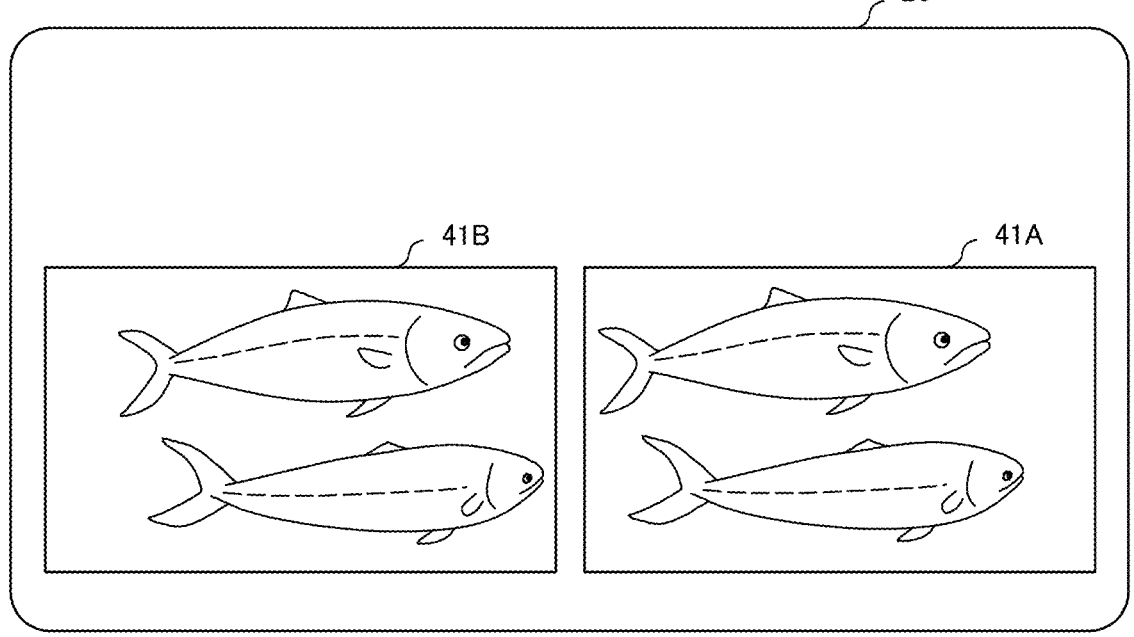
FIG. 4 is a diagram describing an example of a form in which captured images in which fishes, which are objects to be measured, are captured are displayed on a display device.

The display control unit 34 has a function of controlling display operation of the display device 26. For example, when the display control unit 34 receives, from the input device 25, a request to reproduce captured images captured by the cameras 40A and 40B, the display control unit 34 reads, from the storage device 23, the captured images captured by the cameras 40A and 40B in accordance with the request and displays the captured images on the display device 26. FIG. 4 is a diagram illustrating a display example of captured images captured by the cameras 40A and 40B on the display device 26. In the example in FIG. 4, a captured image 41A captured by the camera 40A and a captured image 41B captured by the camera 40B are displayed side by side by means of dual screen display.

The display control unit 34 has a function capable of synchronizing the captured images 41A and 41B with each other in such a way that the image-capturing time points of the captured images 41A and 41B, which are displayed on the display device 26 at the same time, coincide with each other. For example, the display control unit 34 has a function enabling the measurer to adjust each pair of reproduced frames of the captured images 41A and 41B by use of marks for time alignment as described afore that were simultaneously captured by the cameras 40A and 40B.

The detection unit 30 has a function of detecting a fish to be measured and a function of detecting measurement points on the detected fish to be measured in the captured images 41A and 41B, which are displayed (reproduced) on the display device 26.

Figure 6:
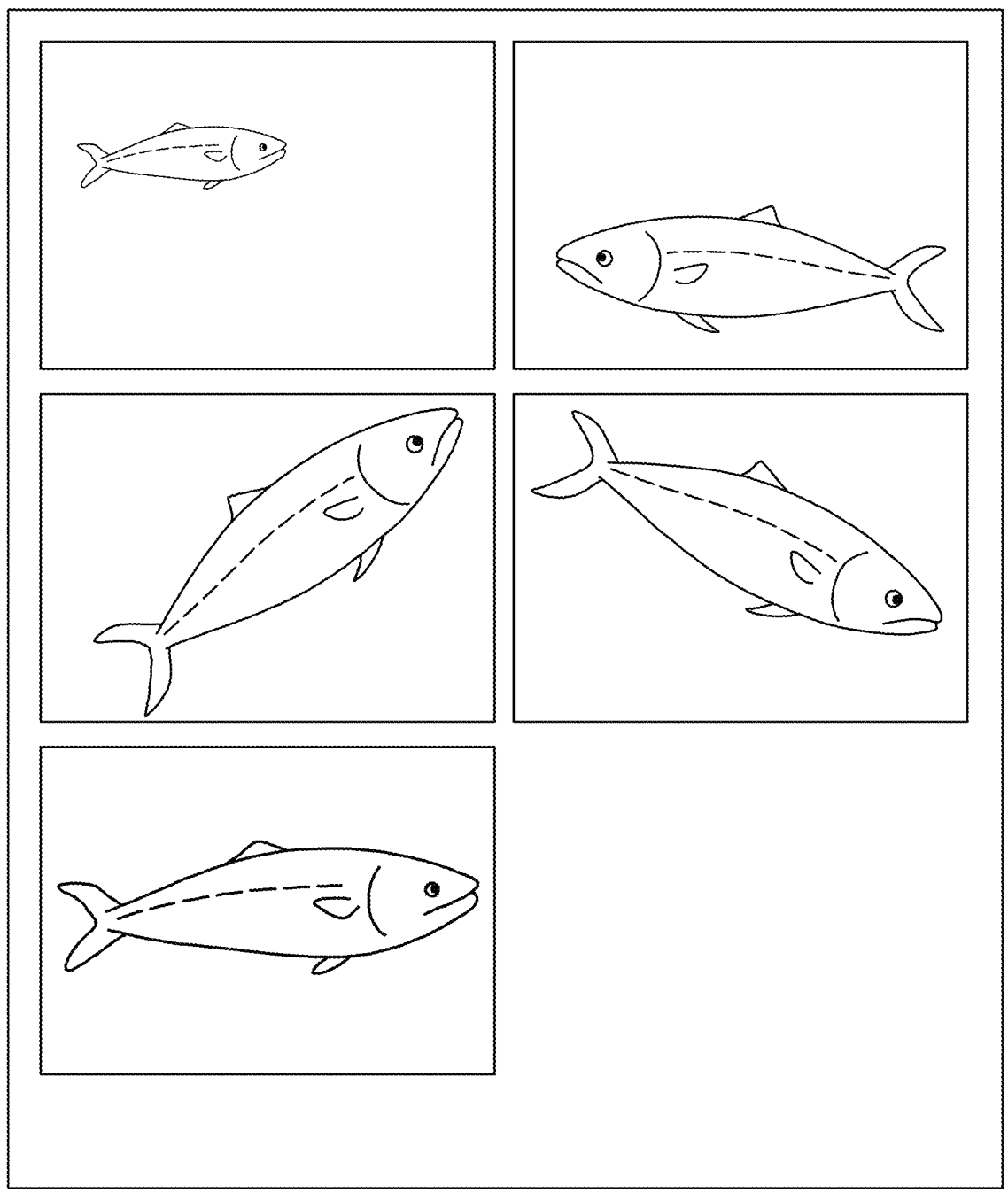
FIG. 6 is a diagram illustrating an example of training data that are used when fish bodies that are objects to be measured are learned through machine learning.
Figure 7:
FIG. 7 is a diagram illustrating an example of fish bodies that are not employed as training data used when fish bodies to be measured are learned through machine learning.

That is, the detection unit 30 detects a fish to be measured in the following way. For example, the detection unit 30 detects, in a pair of frames specified by the measurer or for every preset number of pairs of frames in the captured images 41A and 41B that are displayed (reproduced) on the display device 26, a fish body to be measured by use of reference data for fish body detection, which are stored in the storage device 23. The reference data for fish body detection is generated through, for example, machine learning. In the machine learning, fish bodies of a type to be measured are learned by use of, as training data, a large number of images of fish bodies as illustrated in FIG. 6 captured with respect to the type of fish to be measured. Herein, for example, an image of a fish that largely bends, an image of a fish the inclination of which is large, an image of a fish a portion of the body of which is not captured as illustrated in FIG. 7 are excluded from detection targets and are not learned as fish bodies to be measured. Since such images of fish bodies that were not learned as fish bodies through machine learning are not reflected by the reference data for fish body detection, the detection unit 30 does not detect fish bodies as illustrated in FIG. 7 as a fish to be measured. There exist various methods of machine learning, and an appropriate method of machine learning is employed herein.

Figure 5:
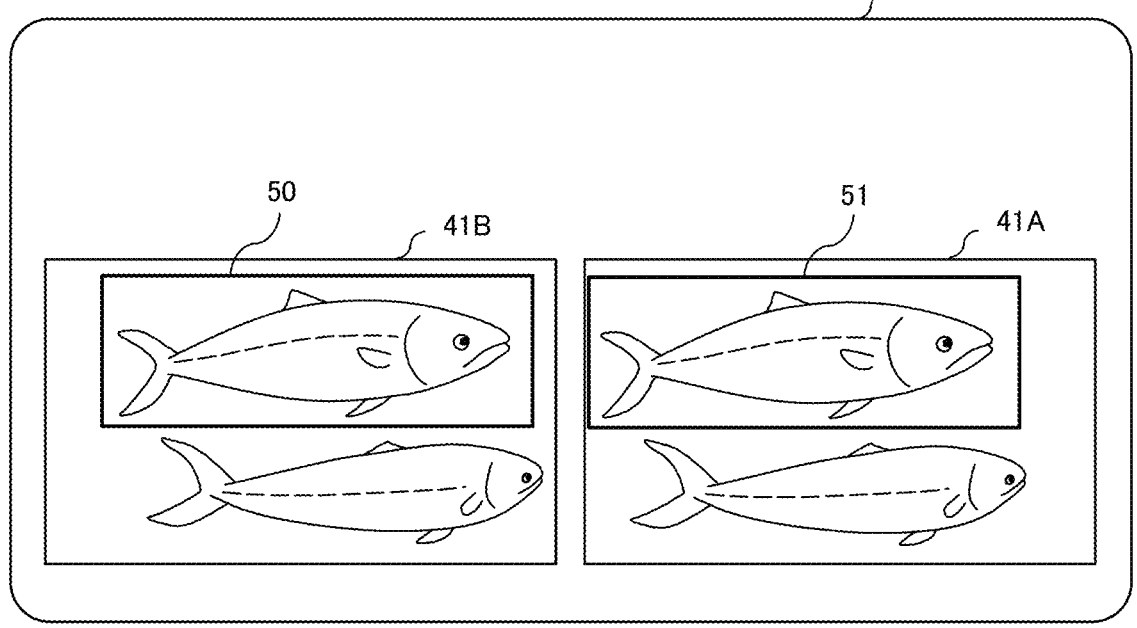
FIG. 5 is a diagram describing an example of objects detected as objects to be measured in the captured image displayed on the display device.

Alternatively, the detection unit 30 may, instead of using the above-described method using machine learning, have a function of detecting a fish to be measured based on input information input by the measurer. In this case, for example, the detection unit 30 displays, by use of the display control unit 34, a message such as "Specify (select) a fish to be measured" on the display device 26 on which the captured images 41A and 41B are displayed as illustrated in FIG. 4. The measurer, for example, operating the input device 25 and thereby enclosing a fish to be measured with borders 50 and 51 as illustrated in FIG. 5 in the captured images 41A and 41B, respectively, causes the fish to be measured to be brought into a state of being specified. The detection unit 30 detects a fish to be measured based on display position information of the borders 50 and 51. The borders 50 and 51 is formed into, for example, rectangular shapes (including squares), and the sizes and aspect ratios of the borders 50 and 51 are configured to be varied by the measurer. When the measurer is performing operation of specifying a fish to be measured with the borders 50 and 51, the captured images 41A and 41B are in a state of being temporarily suspended and stationary.

Still alternatively, the detection unit 30 may detect a fish to be measured in the following way. In this case, a screen area in which one of the captured images 41A and 41B is displayed (for example, the left side screen area in FIGS. 4 and 5) is set as an operation screen, and a screen area in which the other is displayed (for example, the right side screen area in FIGS. 4 and 5) is set as a reference screen. The detection unit 30 prompts, through message display or the like, the measurer to specify a fish to be measured with the border 50 in the operation screen and acquires information of the position at which the border 50 is displayed through operation by the prompted measurer. The detection unit 30 calculates, based on interval information representing the interval between the cameras 40A and 40B, a display position of the border 51 in the captured image 41A in the reference screen, the border 51 representing the same region as a region specified by the border 50 in the captured image 41B. Based on the information of the display positions of the borders 50 and 51 acquired in this manner, the detection unit 30 detects a fish to be measured.

The detection unit 30 has a function of, while the position and size of the border 50 are adjusted by the measurer in the captured image 41B, varying the position and size of the border 51 in the captured image 41A, following the position and size of the border 50. Alternatively, the detection unit 30 may have a function of, after the position and size of the border 50 have been fixed in the captured image 41B, causing the border 51 to be displayed in the captured image 41A. Still alternatively, the detection unit 30 may have both the function of varying the position and size of the border 51, following the adjustment of the position and size of the border 50 and the function of, after the position and size of the border 50 have been fixed, displaying the border 51 and perform, for example, the function alternatively selected by the measurer.

Figure 8:
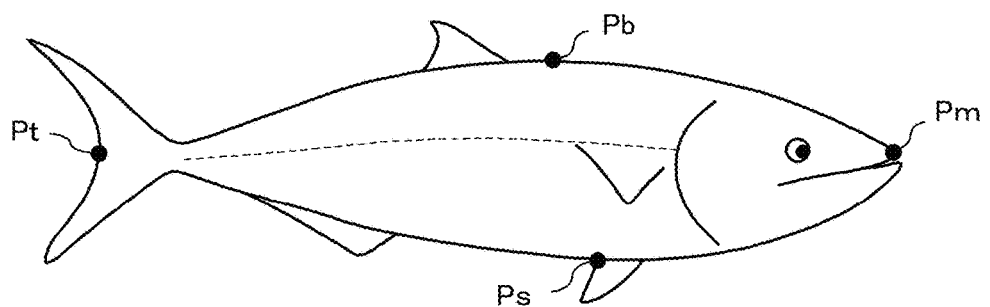
FIG. 8 is a diagram describing positions on a fish body that are detected as measurement-use points in the first example embodiment.

The detection unit 30 further has a function of detecting measurement-use points on a fish detected as a measurement target in the captured images 41A and 41B, the measurement-use points having predetermined features. Herein, a bifurcating portion Pt of the tail and the mouth Pm of a fish as illustrated in FIG. 8 that are used for measurement of the fork length of the fish are detected as measurement-use points. Further, a top portion Pb on the back side and a joint portion Ps of the pelvic fin as a most bulging portion on the abdomen side as illustrated in FIG. 8 that are used for measurement of the body depth of the fish are also detected as measurement-use points. While there exist various methods for the detection method of the measurement-use points Pt, Pm, Pb, and Ps and, herein, the detection unit 30 detects the measurement-use points by use of an appropriate method selected in consideration of needs of the measurer and the performance of the control device, examples of the detection method will be described below.

For example, the detection unit 30 prompts, by means of message display or the like, the measurer to specify (point) measurement-use points in an image of a fish to be measured by use of the input device 25 and detects, based on operation by the measurer who has received the message or the like, the measurement-use points in the image of the fish to be measured. The measurement-use points specified by the measurer are clearly indicated on the display device 26 by the display control unit 34, and this function causes a configuration by which the measurer can confirm the positions of the measurement-use points that the measurer has specified to be provided to the information processing device 10. The information processing device 10 is also provided with a configuration of, after the measurer has specified the measurement-use points, receiving correction of the specification of the measurement-use points.

Figure 9:
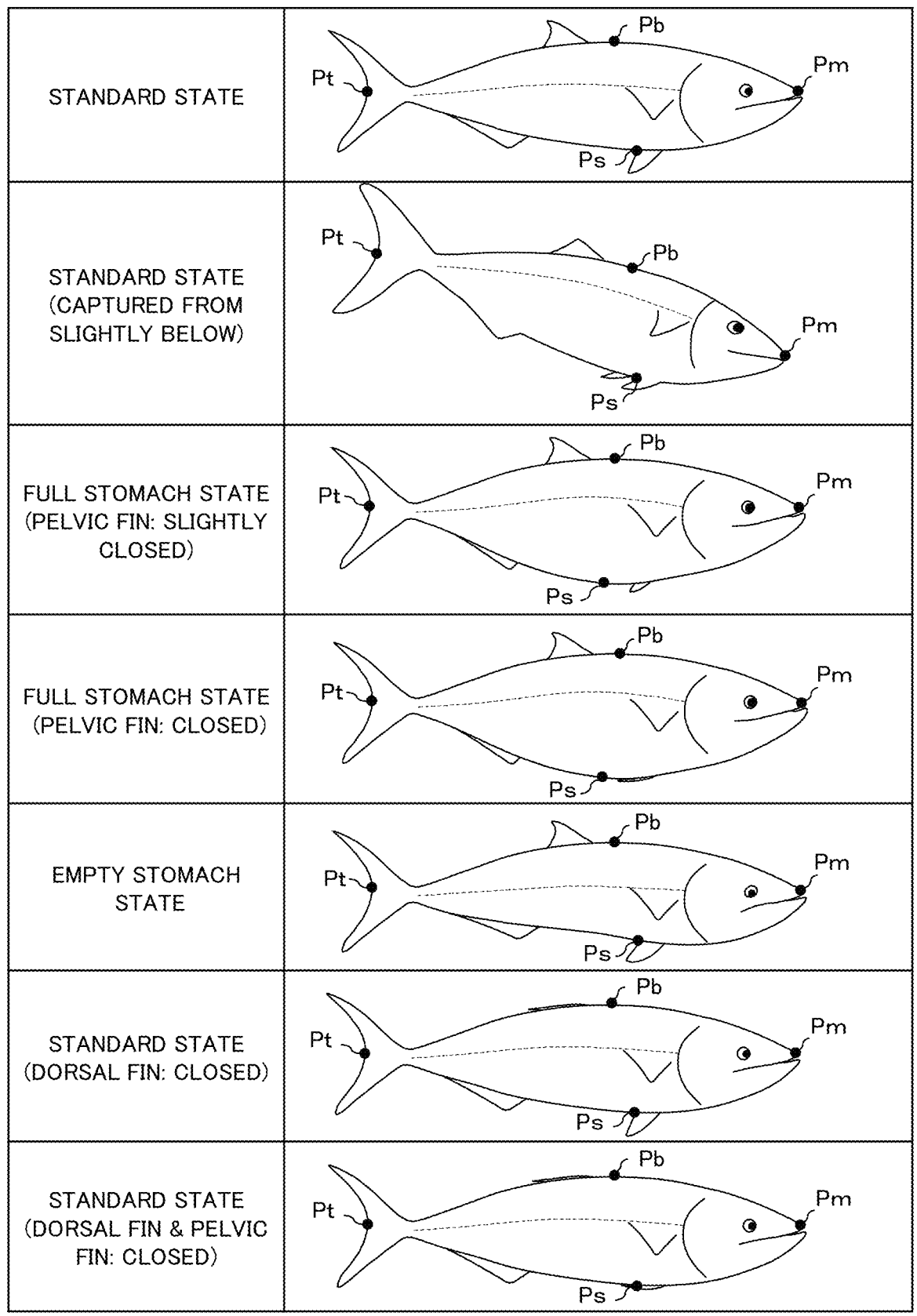
FIG. 9 is a diagram illustrating an example of training data that are used when measurement-use points on fish bodies are learned through machine learning.

As another example of the detection method of measurement-use points, the detection unit 30 may, for example, detect the measurement-use points Pt, Pm, Pb, and Ps, based on reference data for detection of measurement-use points, which are generated through machine learning. The reference data for detection of measurement-use points are generated through machine learning using, as training data, image data of whole fish bodies provided with measurement-use points Pt, Pm, Pb, and Ps as illustrated in FIG. 9 and are stored in the storage device 23.

Even the same fish has different degrees of bulging of the abdomen among a full stomach state (for example, immediately after feeding), an empty stomach state (for example, before feeding), and a standard state (for example, at an intermediate time point of a time interval between preset feeding timings). Depending on such a degree of bulging of the abdomen, a way of using the pelvic fin and the dorsal fin at the time of swimming, and the like, appearances of the pelvic fin of a fish in captured images differ from one another. Therefore, the reference data for detection of measurement-use points are generated through machine learning using training data that are selected in consideration of such various states.

Figure 10:
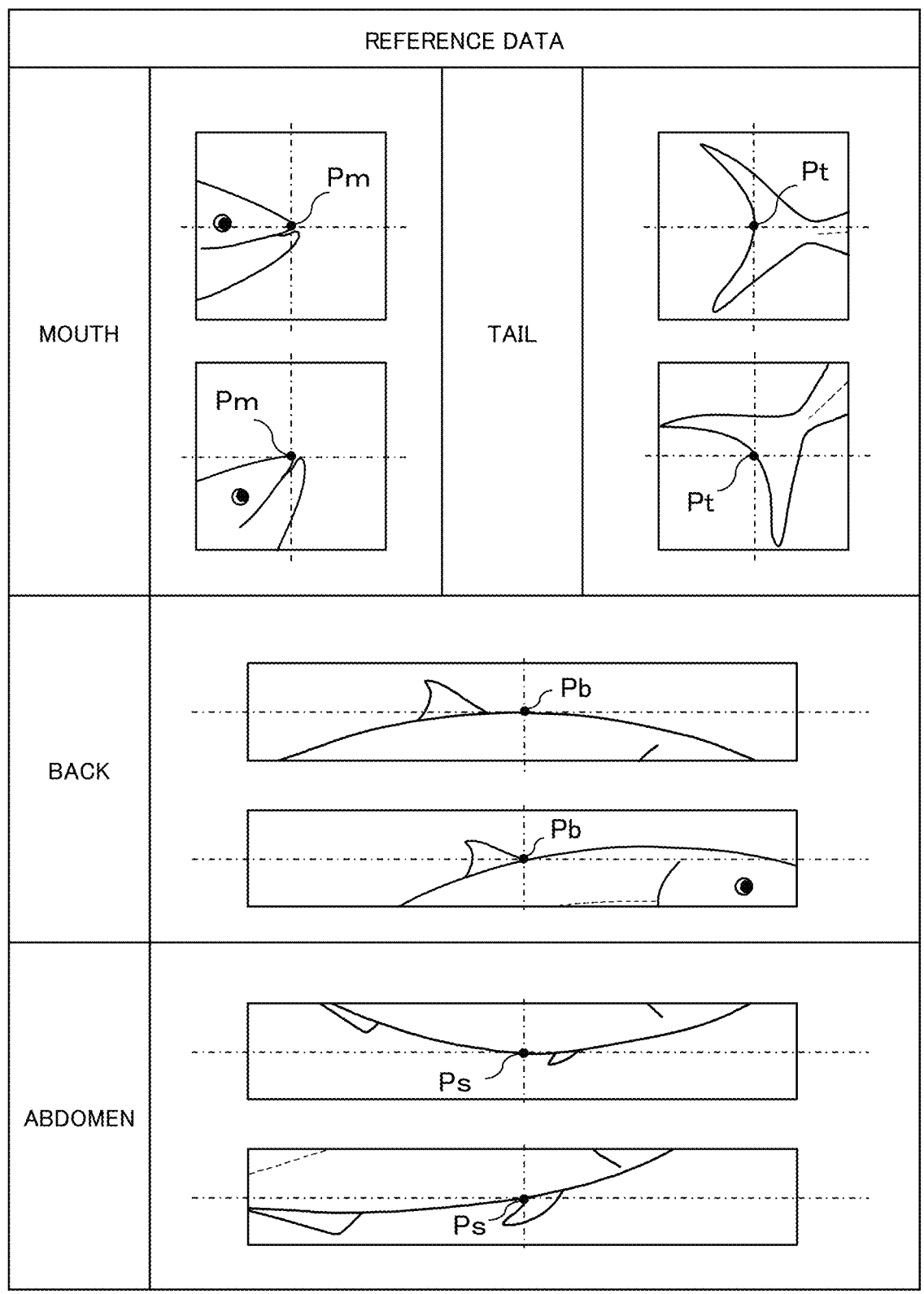
FIG. 10 is a diagram illustrating an example of reference data for detecting measurement-use points, the reference data being generated by use of machine learning.

The reference data for detection of measurement-use points that the detection unit 30 uses may be, instead of reference data of whole fish bodies, reference data of each fish body part as illustrated in FIG. 10. The reference data of each fish body part are generated through machine learning using, as training data, image data of each fish body part provided with one of the measurement-use points Pt, Pm, Pb, and Ps. Herein, images that are extracted in such a way that the center of the image data of each fish body part coincides with one of the measurement-use points Pt, Pm, Pb, and Ps are used as training data. The reference data for detection of measurement-use points with respect to each fish body part learned through machine learning using such training data have a meaning that the center position of each piece of the training data represents one of the measurement-use points Pt, Pm, Pb, and Ps.

The detection unit 30 further has a function of, by use of the display control unit 34, clearly indicating the positions of detected measurement-use points Pt, Pm, Pb, and Ps on the display device 26, using, for example, marks, points, or the like. The measurement-use points Pt, Pm, Pb, and Ps may be clearly indicated in both the captured images 41A and 41B on the display device 26 or in one of the captured images 41A and 41B (for example, the captured image 41B, which is the operation screen).

The specification unit 31 has a function of specifying coordinates representing the positions in a coordinate space of measurement-use points Pt, Pm, Pb, and Ps on a fish to be measured, which are detected by the detection unit 30. For example, the specification unit 31 receives, from the detection unit 30, display position information representing display positions at which the measurement-use points Pt, Pm, Pb, and Ps on the fish to be measured, which were detected by the detection unit 30, are displayed in the captured images 41A and 41B. The specification unit 31 reads the interval information representing the interval between the cameras 40A and 40B (that is, image-capturing positions) from the storage device 23. The specification unit 31 specifies (calculates) the coordinates in the coordinate space of the measurement-use points Pt, Pm, Pb, and Ps on the fish to be measured, by use of a triangulation method.

Figure 11:
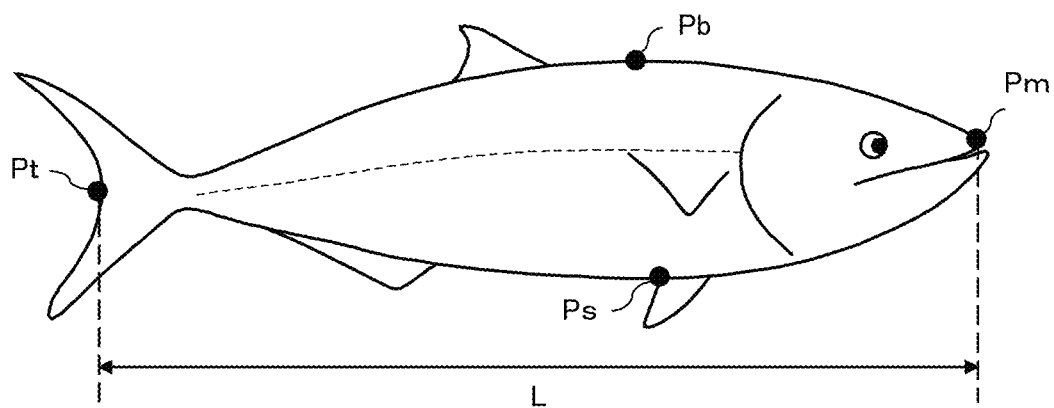
FIG. 11 is a diagram describing the fork length of a fish body that is calculated in the first example embodiment.

The calculation unit 32 has a function of calculating, by use of the spatial coordinates of the measurement-use points Pm and Pt, which were specified by the specification unit 31, of the mouth and the tail on a fish to be measured, an interval L between the measurement-use points Pm and Pt as illustrated in FIG. 11 as the fork length of the fish to be measured (length of the measurement target).

Figure 12:
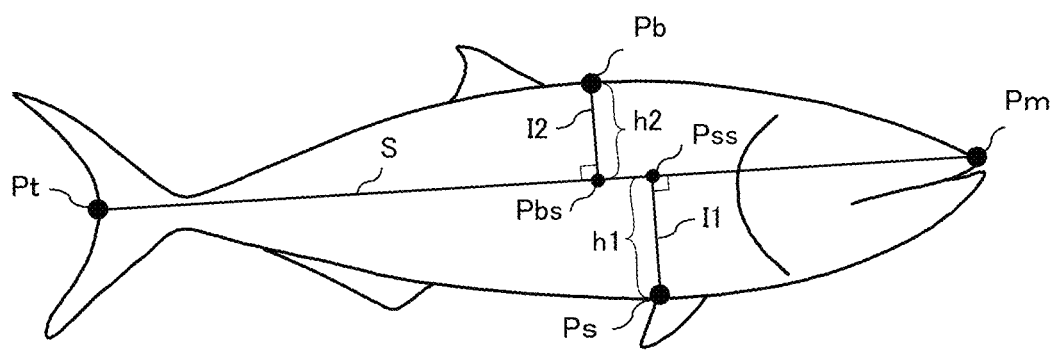
FIG. 12 is a diagram describing a method by which a body depth of a fish body is calculated in the first example embodiment.

The calculation unit 32 also has a function of calculating a body depth of the fish to be measured (length of the measurement object) in the following manner. That is, the calculation unit 32 sets a straight line S connecting the measurement-use points Pm and Pt of the mouth and the tail as illustrated in FIG. 12 as a baseline. The calculation unit 32 calculates, on a perpendicular I1 that is perpendicular to the baseline S and passes the measurement-use point Ps, a length h1 of a line segment PsPss between an intersection point Pss of the perpendicular I1 and the baseline S and the measurement-use point Ps. Further, the calculation unit 32 calculates, on a perpendicular I2 that is perpendicular to the baseline S and passes the measurement-use point Pb, a length h2 of a line segment PbPbs between an intersection point Pbs of the perpendicular I2 and the baseline S and the measurement-use point Pb. Still further, the calculation unit 32 adds the calculated lengths h1 and h2 of the line segments and calculates the added value H (H=h1+h2) as the body depth of the fish to be measured. In other words, the calculation unit 32 calculates a body depth of the fish that is the length of a measurement target in the direction orthogonal to the baseline S. As described above, the calculation unit 32 calculates a length between both ends of the baseline S as the fork length that is one of the lengths of the measurement target.

The fork length L and the body depth H of a fish to be measured calculated by the calculation unit 32 as described above are stored in the storage device 23 in association with predetermined information, such as observation date and time.

The analysis unit 33 has a function of performing predetermined analysis by use of the fork lengths L and body depths H of a plurality of fishes and information associated with the information, which are stored in the storage device 23. For example, the analysis unit 33 calculates an average of the fork lengths L of a plurality of fishes in the fish preserve 48 at the observation date. Alternatively, the analysis unit 33 calculates an average of the fork lengths L of a specific fish that is set as an analysis target. In this case, the average of a plurality of fork lengths L of the fish to be analyzed that are calculated from images of the fish to be analyzed in a plurality of frames of a video captured for a short period of time, such as one second, is calculated.

When the average of the fork lengths L of a plurality of fishes in the fish preserve 48 is calculated and the fishes are not individually identified, it is concerned that, as the values of the fork lengths L of fishes that are to be used for the calculation of the average, values of the same fish may be used in a duplicate manner. Note, however, that, when the average of the fork lengths L of a large number of fishes is calculated, adverse effect of using a value in a duplicate manner on the calculation precision of the average becomes small.

The analysis unit 33 may calculate a relationship between the fork lengths L of fishes in the fish preserve 48 and the number of the fishes (fish body number distribution with respect to the fork lengths L of fishes). Further, the analysis unit 33 may calculate temporal change in the fork length L of a fish, which represents a growth of the fish.

Further, the analysis unit 33 also has a function of calculating a weight of a fish to be measured by use of data for weight calculation that are stored in the storage device 23 in advance and the calculated fork length L and body depth H. The data for weight calculation are data for calculating a weight of a fish, based on the fork length L and body depth H of the fish and are, for example, provided in a form of mathematical formula. The data for weight calculation are data generated based on a relationship between the fork length and body depth and the weight that is acquired based on actually measured fork lengths, body depths, and weights of fishes. When the relationship between the fork length and body depth and the weight differs depending on the age in month or age in year of a fish, the data for weight calculation are generated with respect to each age in month or each age in year and stored in the storage device 23. In this case, the analysis unit 33 calculates a weight of the fish to be measured, based on data for weight calculation according to the age in month or age in year of the fish to be measured and the calculated fork length L and body depth H of the fish to be measured.

The weight of the fish to be measured, which is calculated by the analysis unit 33, and the fork length L and body depth H of the fish to be measured, which are calculated by the calculation unit 32, are stored in the storage device 23 in association with each other and also in association with predetermined information (for example, image-capturing date and time). The display control unit 34 may have a function of, when, for example, the measurer inputs, by use of the input device 25, an instruction to make the display device 26 display the calculated values, receiving the instruction, reading information to be displayed from the storage device 23, and displaying the information on the display device 26.

Figure 13:
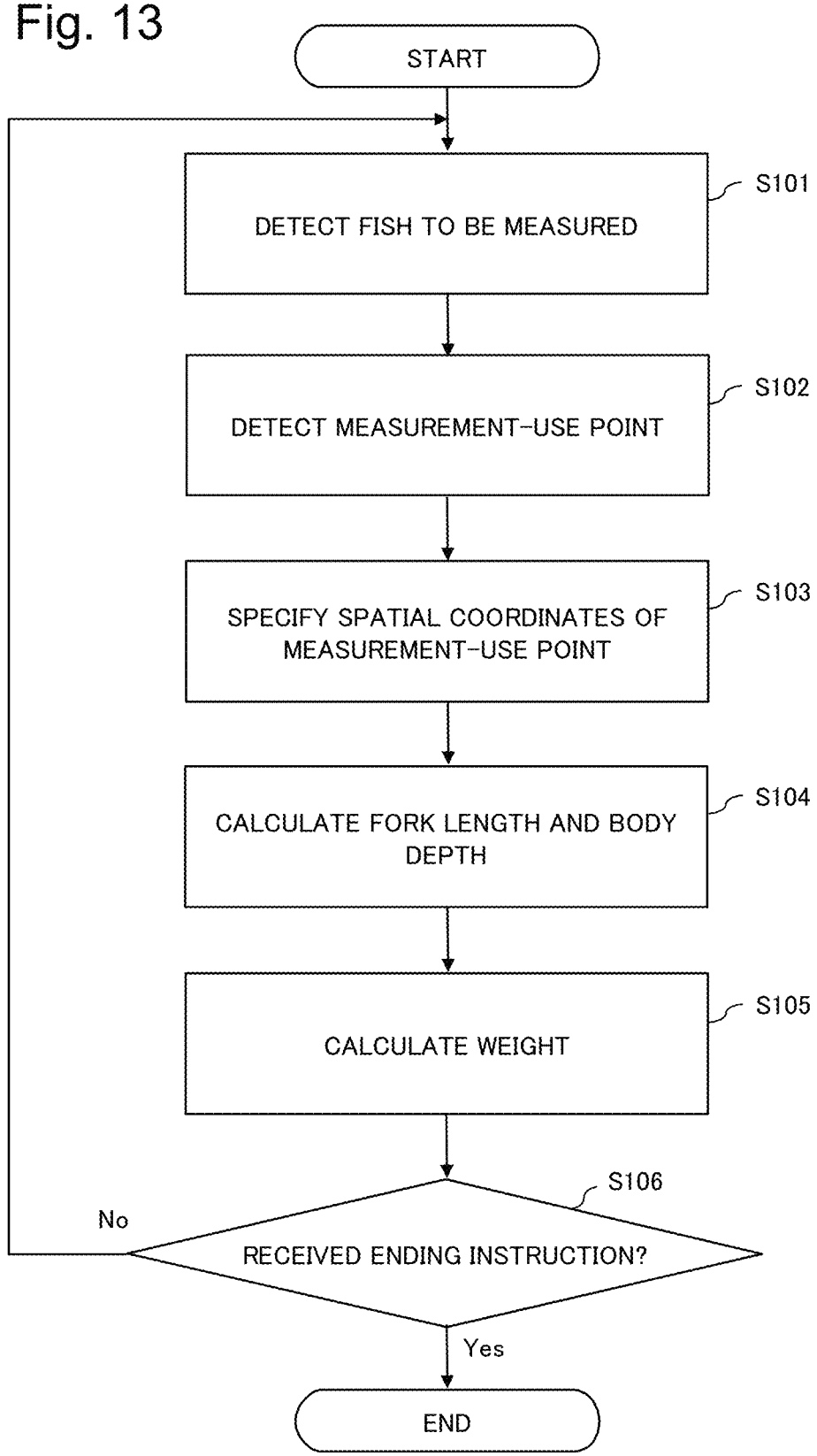
FIG. 13 is a flowchart describing an example of operation relating to measurement of a fish body performed by the information processing device in the first example embodiment.

An example of operation in which the information processing device 10 calculates (measures) a fork length L, a body depth H, and a weight of a fish in the captured images 41A and 41B will be described below with reference to FIG. 13. FIG. 13 is a flowchart illustrating processing steps relating to calculation (measurement) of a fork length L, a body depth H, and a weight of a fish performed by the information processing device 10.

For example, upon receiving an instruction instructing the start of measurement, the detection unit 30 of the information processing device 10 detects a fish to be measured in captured images 41A and 41B (step S101). The detection operation of the fish to be measured is detection operation based on reference data for fish body detection learned through machine learning. Alternatively, the detection operation of the fish to be measured is detection operation based on input information that is input by a measurer by use of the input device 25. Further, the detection unit 30 may detect a fish to be measured through one detection operation of the detection operation based on the reference data for fish body detection learned through machine learning and the detection operation based on the input information manually input by the measurer, the one detection operation being selected based on selection information input by the measurer by use of the input device 25.

After having detected the fish to be measured, the detection unit 30 detects measurement-use points Pt, Pm, Pb, and Ps on the fish to be measured (step S102). The detection operation of the measurement-use points Pt, Pm, Pb, and Ps is detection operation based on reference data for detection of measurement-use points learned through machine learning. Alternatively, the detection operation of the measurement-use points Pt, Pm, Pb, and Ps is detection operation based on input information that is manually input by the measurer. Alternatively, the detection unit 30 may detect the measurement-use points Pt, Pm, Pb, and Ps through one detection operation of the detection operation based on the reference data for detection of measurement-use points learned through machine learning and the detection operation based on the input information manually input by the measurer, the one detection operation being selected based on selection information input by the measurer by use of the input device 25.

Subsequently, the specification unit 31 specifies the coordinates in the coordinate space of the detected measurement-use points Pt, Pm, Pb, and Ps by use of, for example, interval information between the cameras 40A and 40B (image-capturing positions) or the like and a triangulation method (step S103).

The calculation unit 32 calculates, based on the specified coordinates, an interval L between the measurement-use points Pm and Pt (the mouth and the tail) as the fork length of the fish to be measured. The calculation unit 32 sets a straight line S connecting the measurement-use points Pm and Pt as a baseline and calculates a length h1 of a line segment PsPss perpendicular to the baseline S and a length h2 of a line segment PbPbs perpendicular to the baseline S. Further, the calculation unit 32 calculates an added value of the calculated lengths h1 and h2 as the body depth H of the fish to be measured (step S104).

Subsequently, the analysis unit 33 calculates, by use of the calculated fork length L and body depth H of the fish to be measured and data for weight calculation that are stored in the storage device 23, a weight of the fish to be measured (step S105).

The fork length L, body depth H, and weight of the fish to be measured, which are calculated as described above, are stored in the storage device 23 in association with each other and also in association with predetermined information (for example, image-capturing date and time).

Subsequently, the control device 22 of the information processing device 10 determines whether an instruction instructing the ending of the measurement operation of a fish has been input by, for example, the measurer through operation of the input device 25 (step S106). When the instruction of the ending has not been input, the control device 22 repeats the operation in step S101 and subsequent steps. When the instruction of the ending has been input, the control device 22 terminates the measurement operation of a fish.

The information processing device 10 of the first example embodiment has a function of the detection unit 30 detecting the measurement-use points Pt, Pm, Pb, and Ps on a fish to be measured in captured images 41A and 41B captured by the cameras 40A and 40B. The information processing device 10 has a function of the specification unit 31 specifying coordinates in the coordinate space representing the positions of the detected measurement-use points Pt, Pm, Pb, and Ps. Further, the information processing device 10 has a function of the calculation unit 32 calculating, by use of the measurement-use points Pt and Pm, a fork length L of the fish to be measured. Still Further, the information processing device 10 has a function of the analysis unit 33 calculating a body depth H, based on a baseline S determined based on the measurement-use points Pt and Pm and the measurement-use points Pb and Ps. In the first example embodiment, the body depth H of the fish to be measured is calculated by adding the length h1 of a line segment PsPss perpendicular to the baseline S and the length h2 of a line segment PbPbs perpendicular to the baseline S. Calculating the body depth H in this manner enables the information processing device 10 to increase the accuracy of the body depth H to be calculated. In other words, the shape of a fish to be measured is not a line-symmetric shape with respect to the baseline S determined based on the measurement-use points Pt and Pm. Therefore, a most bulging portion (the measurement-use point Pb) on the back side of the baseline S and a most bulging portion (a neighboring area of the measurement-use point Ps) on the abdomen side of the baseline S are not necessarily arranged on the same perpendicular that is perpendicular to the baseline S. Because of this situation, there is a probability that calculating a length of a line segment simply connecting the measurement-use points Pb and Ps as a body depth causes a value deviating by a large amount from the actual body depth of the fish to be calculated as the body depth. On the other hand, in the first example embodiment, as described above, the analysis unit 33 separately calculates a length h1 between the measurement-use point Ps and the baseline S and a length h2 between the measurement-use point Pb and the baseline S and calculates an added value of the calculated lengths h1 and h2 as the body depth H. This configuration enables the accuracy of the calculated value of the body depth calculated by the analysis unit 33 to be increased.

Since the analysis unit 33 calculates a weight of the fish to be measured by use of the body depth H and the fork length L the accuracy of which can be increased in this way, the accuracy of the calculated value of the weight can also be increased.

Therefore, the information processing device 10 of the first example embodiment is able to increase reliability for calculated values of the body depth H and weight of a fish to be measured.

The information processing device 10 of the first example embodiment sometimes has a configuration in which the detection unit 30 detects a fish body to be measured and measurement-use points Pt, Pm, Pb, and Ps, based on reference data for fish body detection and reference data for detection of measurement-use points learned through machine learning. Since, in this case, the measurer does not have to perform an operation of specifying a fish to be measured and an operation of specifying measurement-use points Pt, Pm, Pb, and Ps, the information processing device 10 is able to reduce the effort of the measurer. The information processing device 10 is also able to achieve speed-up of processing of measuring the fork length L, the weight, and the like of a fish.

Second Example Embodiment

A second example embodiment according to the present invention will be described below. In the description of the second example embodiment, the same signs are assigned to constituent components having the same names as those of constituent components constituting the information processing device and the object measurement system (fish measurement system) of the first example embodiment, and redundant descriptions of the common components will be omitted.

Figure 14:
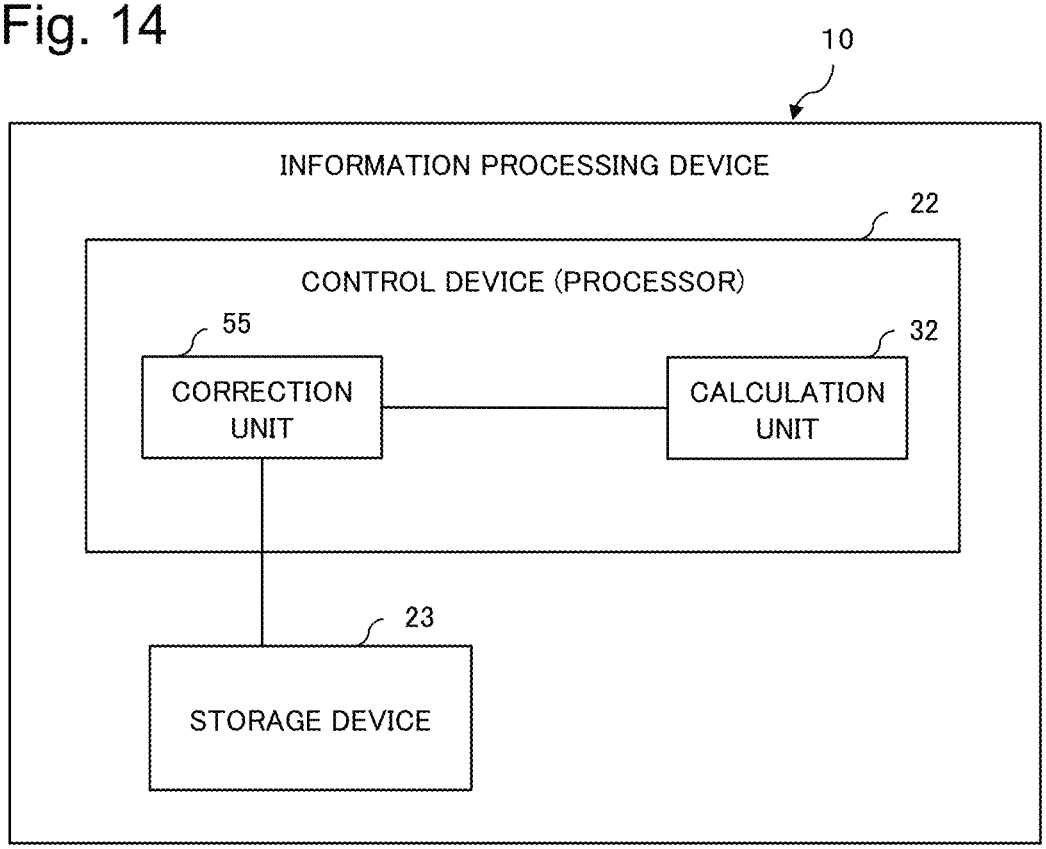
FIG. 14 is a block diagram extracting and illustrating characteristic constituent components of an information processing device of a second example embodiment according to the present invention.

An information processing device 10 and a fish measurement system of the second example embodiment include a correction unit 55 illustrated in FIG. 14 in addition to the constitution of the first example embodiment. Although the information processing device 10 of the second example embodiment includes, as with the first example embodiment, a specification unit 31, a calculation unit 32, an analysis unit 33, and a display control unit 34, illustration of the constituent components is omitted in FIG. 14. In FIG. 14, illustration of a storage device 24, an input device 25, and a display device 26 is also omitted.

Figure 15:
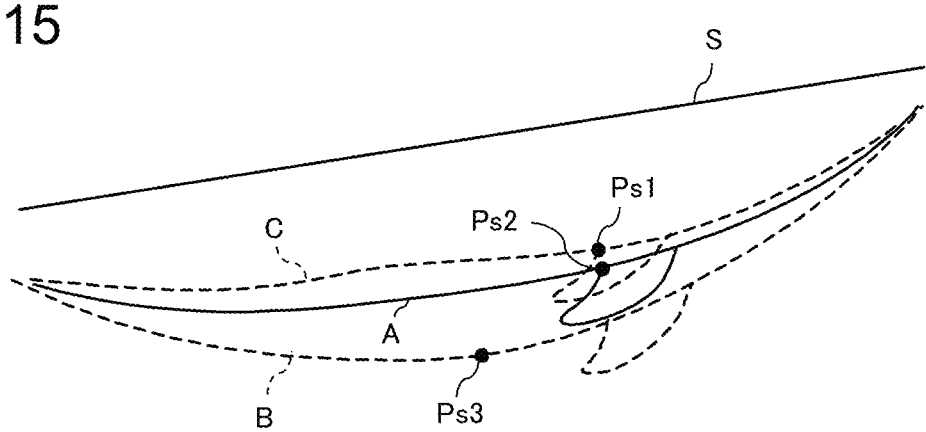
FIG. 15 is a diagram describing a function of a correction unit that the information processing device of the second example embodiment includes.

In the afore-described first example embodiment, a joint portion of the pelvic fin that is assumed to be a most bulging portion on the abdomen side of a fish is detected as a measurement-use point. However, as illustrated in FIG. 15, the degree of bulging of the abdomen of a fish differs among a standard state (see a solid line A), a full stomach state (see a dotted line B), and an empty stomach state (see a dotted line C), and, in the full stomach state, a most bulging portion on the abdomen side of the fish is not a joint portion of the pelvic fin but a portion indicated by a point Ps3. Therefore, when a detection unit 30 detects a joint portion of the pelvic fin on a fish in the full stomach state as a measurement-use point Ps and the calculation unit 32 calculates a body depth H by use of the measurement-use point Ps, the calculated body depth H becomes a value deviating from an actual body depth of the fish in the full stomach state. It is concerned that, when a detected fish body is in the full stomach state, a weight calculated by the analysis unit 33 becomes a value lighter than the actual weight.

Although, in the standard state and the empty stomach state, the most bulging portion on the abdomen side of a fish can be said to be the joint portion of the pelvic fin, the abdomen is more depressed and the weight has become lighter in the empty stomach state than in the standard state. When the joint portion of the pelvic fin is detected as the measurement-use point Ps and a body depth H and a weight of the fish body are calculated by use of the measurement-use point Ps, values similar to those in the standard state are caused to be calculated for the body depth H and the weight in the empty stomach state despite the weight in the empty stomach state being lighter than that in the standard state. In FIG. 15, the joint portion of the pelvic fin in the standard state is a portion indicated by a point Ps2, and the joint portion of the pelvic fin in the empty stomach state is a portion indicated by a point Ps1.

The information processing device 10 of the second example embodiment includes a configuration configured in consideration of the above-described situation. In other words, the correction unit 55 has a function of, when the shape (bulging) of a fish to be measured deviates from that in the standard state, correcting the measurement-use point Ps on the abdomen side detected by the detection unit 30 in the following manner. That is, reference data of fish bodies in the standard state, which are generated through machine learning, are stored in a storage device 23. When the correction unit 55 determines, with reference to the reference data of fish bodies in the standard state, that the shape (bulging) of the abdomen of the fish body to be measured is in a state deviating from the standard state in excess of an allowable range, the correction unit 55 determines that it is required to correct the measurement-use point Ps.

The correction unit 55 corrects the measurement-use point Ps on the abdomen side in accordance with data for correction provided in advance. The data for correction are data used to correct the measurement-use point Ps according to the shape (bulging) of the abdomen of a fish to be measured. To give a specific example, the data for correction include data as follows. One type of data included in the data for correction are data for, in the case of a state in which the shape of the abdomen bulges more than in the standard state (the full stomach state), correcting the measurement-use point Ps to a most bulging portion of the abdomen. Another type of data included in the data for correction are data for, in the case of a state in which the shape of the abdomen is more depressed than in the standard state (the empty stomach state), correcting the measurement-use point Ps to a most depressed portion of the abdomen. Such data for correction are generated through, for example, machine learning.

When such data for correction are used, the correction unit 55 corrects the measurement-use point Ps to a most bulging portion of the abdomen when the detected fish body is in the full stomach state and corrects the measurement-use point Ps to a most depressed portion of the abdomen when the detected fish body is in the empty stomach state.

To give another specific example of the data for correction, for example, the data for correction include data as follows. One type of data included in the data for correction are data for, in the case of a state in which the shape of the abdomen bulges more than in the standard state (the full stomach state), correcting the measurement-use point Ps to a position (for example, a middle portion) that is appropriately set between the joint portion of the pelvic fin and a most bulging portion of the abdomen. Another type of data included in the data for correction are data for, in the case of a state in which the shape of the abdomen is more depressed than in the standard state (the empty stomach state), correcting the measurement-use point Ps to a position (for example, a middle portion) that is appropriately set between the joint portion of the pelvic fin and a most depressed portion of the abdomen. Such data for correction are generated through, for example, machine learning.

When such data for correction are used, the correction unit 55 corrects the measurement-use point Ps to a position (for example, a middle portion) that is appropriately set between the joint portion of the pelvic fin and a most bulging portion of the abdomen when the detected fish body is in the full stomach state. The correction unit 55 corrects the measurement-use point Ps to a position (for example, a middle portion) that is appropriately set between the joint portion of the pelvic fin and a most depressed portion of the abdomen when the detected fish body is in the empty stomach state.

The calculation unit 32 adds the length h1 of a line segment PsPss based on the corrected measurement-use point Ps, the line segment PsPss being perpendicular to a baseline S, and the length h2 of a line segment PbPbs based on a measurement-use point Pb, the line segment PbPbs being perpendicular to the baseline S, and calculates the added value as the body depth H.

The constituent components of the information processing device 10 of the second example embodiment other than the above-described constituent components are the same as those in the first example embodiment.

The information processing device 10 of the second example embodiment is capable of achieving the same advantageous effects as those of the first example embodiment. Further, the information processing device 10 has a configuration to correct the measurement-use point Ps according to the shape of the abdomen of a fish. This configuration enables the information processing device 10 to calculate a body depth H and a weight of a fish in accordance with the actual state of the fish.

Third Example Embodiment

A third example embodiment according to the present invention will be described below. In the description of the third example embodiment, the same signs are assigned to constituent components having the same names as those of constituent components constituting the information processing device and the object measurement system (fish measurement system) of the first example embodiment, and redundant descriptions of the common components will be omitted.

Figure 16:
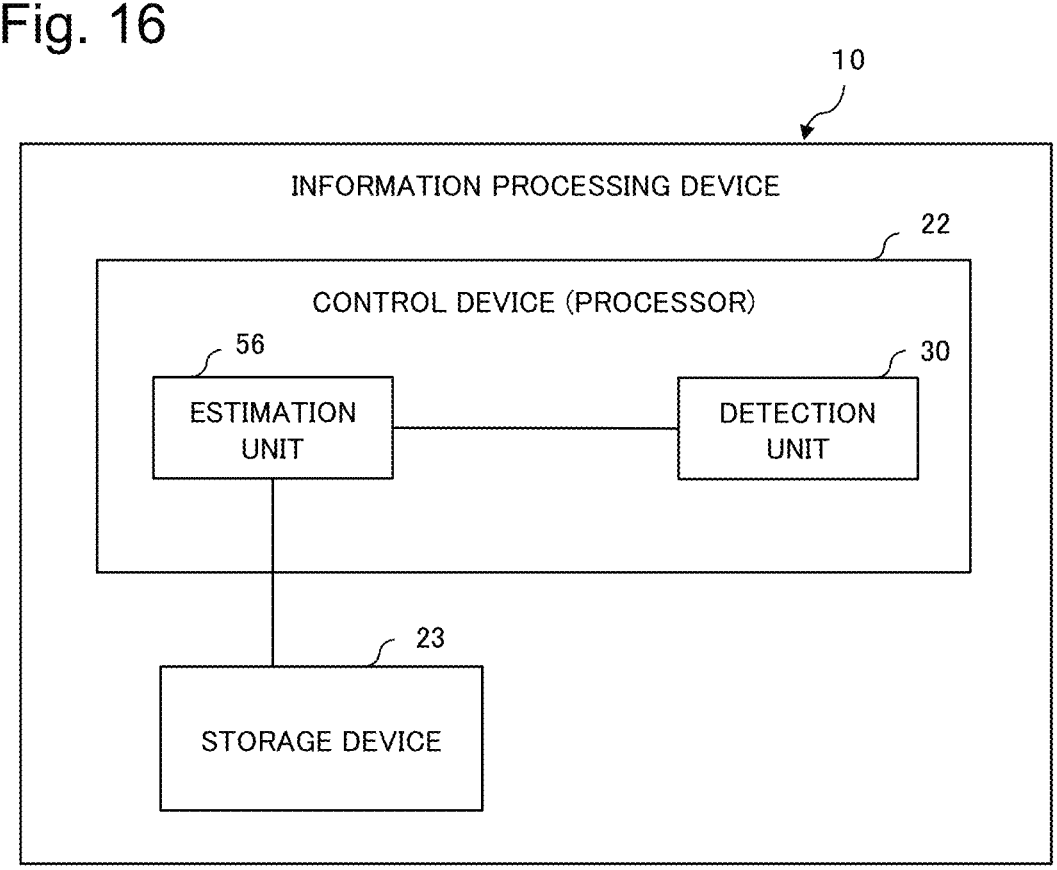
FIG. 16 is a block diagram extracting and illustrating characteristic constituent components of an information processing device of a third example embodiment according to the present invention.

An information processing device 10 and a fish measurement system of the third example embodiment include an estimation unit 56 illustrated in FIG. 16 in addition to the constitution of the first or second example embodiment. Although the information processing device 10 of the third example embodiment includes, as with the first or second example embodiment, a specification unit 31, a calculation unit 32, an analysis unit 33, and a display control unit 34, illustration of the constituent components is omitted in FIG. 16. In FIG. 16, illustration of a storage device 24, an input device 25, and a display device 26 is also omitted.

There are some cases where a fish closely places (closes) the pelvic fin on the body when the moving speed is fast, and the like and it is difficult to detect a measurement-use point Ps that is a joint portion of the pelvic fin. The information processing device 10 of the third example embodiment includes a configuration configured in consideration of such a situation in which the measurement-use point Ps is difficult to detect. In other words, a detection unit 30 sometimes determines that the measurement-use point Ps cannot be detected because the pelvic fin of a fish to be measured is indistinct. In this case, the estimation unit 56 has a function of detecting the measurement-use point Ps by estimating the position of the joint portion of the pelvic fin in accordance with a predetermined rule. For example, when a certain relationship exists between the position of the joint portion of the pelvic fin and the position of the pectoral fin depending on the type of fish to be measured, a rule in accordance with which the position of the joint portion of the pelvic fin is estimated based on the position of the pectoral fin is acquired by use of the relationship and stored in the storage device 23. The estimation unit 56 estimates, by use of such a rule and the position of the pectoral fin, the measurement-use point Ps.

When the estimation unit 56 has estimated the measurement-use point Ps, the calculation unit 32 calculates, by use of the estimated measurement-use point Ps, a length h1 of a line segment PsPss perpendicular to a baseline S and calculates, by use of the length h1, a body depth H of the fish to be measured.

The information processing device 10 of the third example embodiment is capable of achieving the same advantageous effects as those of the first or second example embodiment by including the same configuration as that of the first or second example embodiment. Further, since, by including the estimation unit 56, the information processing device 10 of the third example embodiment is capable of reducing situations in which, because the measurement-use point Ps cannot be detected, the body depth H of a fish to be measured cannot be calculated and, further, the weight also cannot be calculated, achieving an increase in the number of measurements is facilitated.

Further, since such an increase in the number of measurements causes the number of samples that the analysis unit 33 uses in analysis to be increased, it is possible to increase reliability for calculated values that the analysis unit 33 calculates through statistical processing.

The rule used when the measurement-use point Ps is estimated is not limited to the afore-described rule based on a positional relationship between the pelvic fin and the pectoral fin and, when there exists a certain relationship between the position of the mouth and the position of the joint portion of the pelvic fin, the rule may be a rule acquired by use of the relationship. When the position of the pectoral fin is used in such a manner, information of the position of the pectoral fin may be provided to the information processing device 10 by manual input by a measurer or may, for example, be detected by the detection unit 30 by use of reference data learned through machine learning.

Other Example Embodiments

The present invention may, without being limited to the first to third example embodiments, employ various example embodiments. For example, although, in the first to third example embodiments, the information processing device 10 includes the analysis unit 33, the analysis of information of a fork length L and a body depth H calculated by the calculation unit 32 may be performed by an information processing device separate from the information processing device 10 and, in this case, the analysis unit 33 may be omitted.

Although, in the first to third example embodiments, the baseline S is a straight line between the measurement-use points Pm and Pt at the mouth and the tail, the baseline S may be, for example, a curved line by which the measurement-use points Pm and Pt are connected to each other in consideration of the bulging of the fish body.

Further, in the first to third example embodiments, the information processing device 10 may perform image processing to reduce turbidity of water in captured images and image processing to correct distortion of fish bodies in captured images due to trembling of water at an appropriate timing, such as a point of time before the start of detection processing performed by the detection unit 30. The information processing device 10 may perform image processing to correct captured images in consideration of image-capturing conditions, such as depth in the water at which fishes are present and the brightness of water. As described above, the information processing device 10 performing image processing (image correction) on captured images in consideration of an image-capturing environment enables reliability for detection processing performed by the detection unit 30 to be increased.

Further, although, in the first to third example embodiments, description is made using fishes as an example of an object to be measured, the information processing device 10 having the constitution described in the first to third example embodiments is applicable to measurement of other objects. In particular, the information processing device 10 having the constitution described in the first to third example embodiments is capable of, in the case where an object to be measured does not have a line-symmetric shape with respect to a baseline set to the object, appropriately calculating the length to be measured of the object in the direction orthogonal to the baseline.

Figure 17:
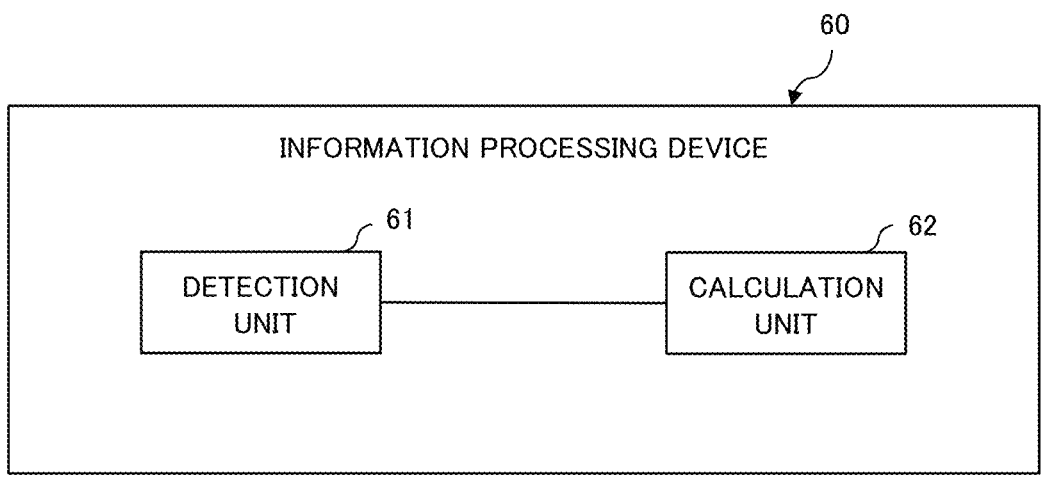
FIG. 17 is a block diagram illustrating a configuration of an information processing device of another example embodiment according to the present invention in a simplified manner.

Further, in FIG. 17, a constitution of an information processing device of another example embodiment according to the present invention is illustrated in a simplified manner. An information processing device 60 in FIG. 17 includes, as functional units, a detection unit 61 and a calculation unit 62. When an object image that is an image of an object to be measures in a captured image in which the object is captured is divided by a baseline that is set to the object image, the detection unit 61 detects a predetermined portion of the object to be used for length measurement as a measurement-use point in each of the divided areas on both sides of the baseline in the image of the object.

The calculation unit 62 calculates, in each of the divided areas, a length of a line segment between an intersection point of a perpendicular that passes the measurement-use point and is perpendicular to the baseline and the baseline and the measurement-use point. Further, the calculation unit 62, by adding the lengths of the line segments each of which is calculated in one of the divided areas of the object to be measured, calculates a length to be measured on the object.

Figure 18:
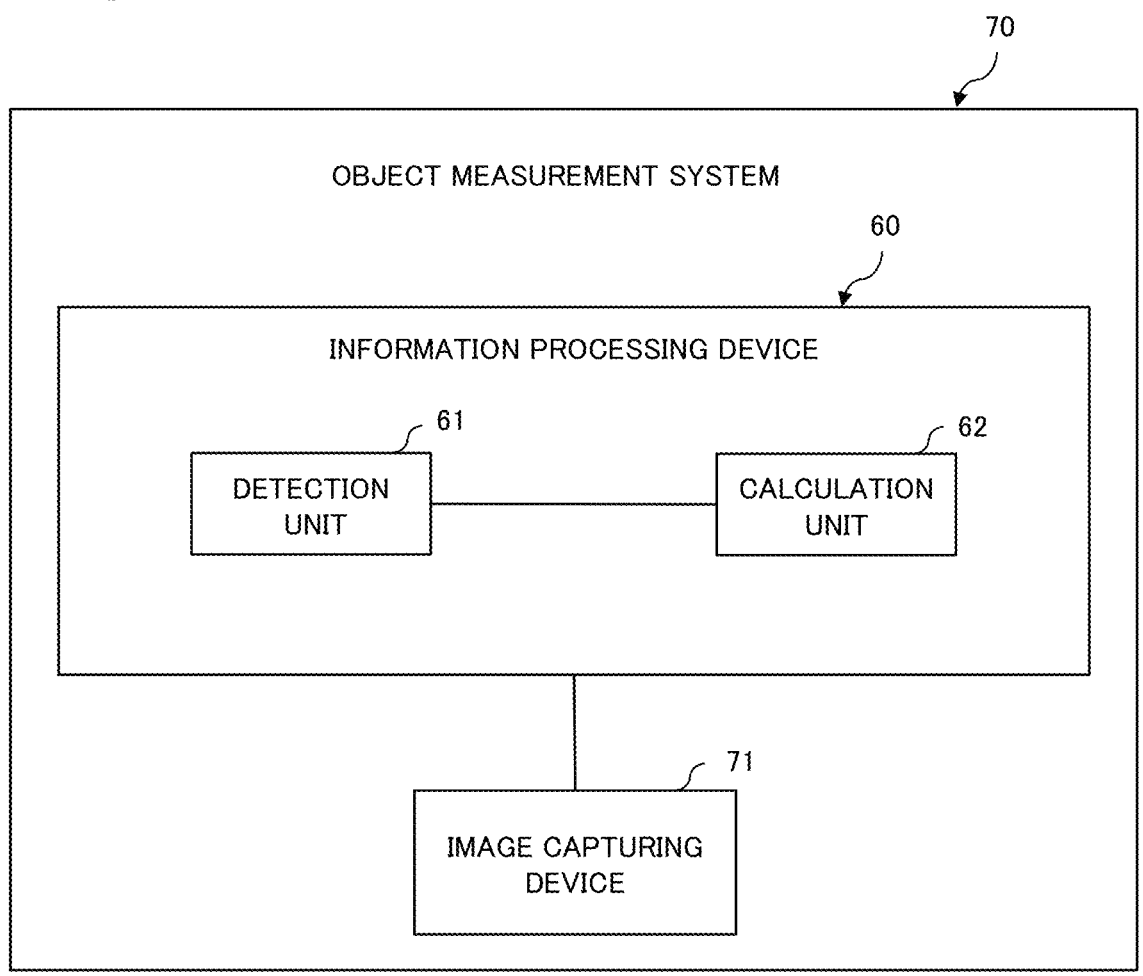
FIG. 18 is a block diagram illustrating a configuration of an object measurement system of the another example embodiment according to the present invention in a simplified manner.

The information processing device 60 is, by including the constitution as described above, capable of increasing the accuracy of measurement values acquired by measuring the length and the like of an object to be measured, based on a captured image. The information processing device 60 as described above constitutes an object measurement system 70 in conjunction with an image capturing device 71 that captures an image of an object to be measured, as illustrated in FIG. 18.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-043236, filed on Mar. 9, 2018, the disclosure of which is incorporated herein in its entirety by reference.

REFERENCE SIGNS LIST

10, 60 Information processing device
30, 61 Detection unit
32, 62 Calculation unit
33 Analysis unit
55 Correction unit
56 Estimation unit

What is claimed is:
1. An information processing device comprising:
at least one processor configured to:
when an object image is divided by a baseline, detect a predetermined portion of an object to be measured as a measurement-use point in each of divided areas on both sides of the baseline in the object image, the object image being an image of the object in each of a plurality of captured images in which the object is captured from different positions at a same time, the predetermined portion being a portion to be used for length measurement;
calculate coordinates of the measurement-use point representing a position in a coordinate space by using the plurality of captured images, the coordinate space being a three-dimensional space;
calculate, in each of the divided areas, a length of a line segment between an intersection point of a perpendicular line and the measurement-use point, the perpendicular line passing through the measurement-use point and the baseline and is perpendicular to the baseline, by using the calculated coordinates of the measurement-use point and coordinates of the baseline in the coordinate space; and
calculate a length to be measured on the object by adding the length of the line segment calculated in each divided area.

2. The information processing device according to claim 1, wherein
the measurement-use point that the at least one processor detects is a portion that bulges in a direction orthogonal to the baseline in each of the divided areas in the object image.

3. The information processing device according to claim 1, wherein
the at least one processor further has a function of detecting ends of the object image in a direction along the baseline by use of reference data learned through machine learning and setting a line connecting the detected ends as the baseline.

4. The information processing device according to claim 1, wherein
the at least one processor is further configured to calculate a weight of the object by use of the calculated length to be measured and data for weight calculation with which a weight of the object is calculated from the calculated length to be measured.

5. The information processing device according to claim 1, wherein
the at least one processor is further configured to, when the object is in a state different from a preset standard state, correct the detected measurement-use point by use of data for correction provided in advance.

6. The information processing device according to claim 1, wherein
the at least one processor is further configured to, when the at least one processor cannot detect the measurement-use point, estimate the measurement-use point in accordance with a rule provided in advance.

7. An object measurement system comprising:
the information processing device according to claim 1;
an image capturing device that captures the plurality of captured images in which the object is captured from the different positions at the same time.

8. The information processing device according to claim 3, wherein
the at least one processor further has a function of also calculating a length between both ends of the baseline set as a length to be measured on the object.

9. An object measurement method comprising by a computer:
when an object image is divided by a baseline, detecting a predetermined portion of an object to be measured as a measurement-use point in each of divided areas on both sides of the baseline in the object image, the object image being an image of the object in each of a plurality of captured images in which the object is captured from different positions at a same time, the predetermined portion being a portion to be used for length measurement;
calculating coordinates of the measurement-use point representing a position in a coordinate space by using the plurality of captured images, the coordinate space being a three-dimensional space; and
calculating, in each of the divided areas, a length of a line segment between an intersection point of a perpendicular line and the measurement-use point, the perpendicular line passing through the measurement-use point and the baseline and is perpendicular to the baseline, by using the calculated coordinates of the measurement-use point and coordinates of the baseline in the coordinate space; and
calculating a length to be measured on the object by adding the length of the line segment calculated in each divided area.

10. A non-transitory program storage medium storing a computer program causing a computer to perform:
when an object image is divided by a baseline, detecting a predetermined portion of an object to be measured as a measurement-use point in each of divided areas on both sides of the baseline in the object image, the object image being an image of the object in each of a plurality of captured images in which the object is captured from different positions at a same time, the predetermined portion being a portion to be used for length measurement;
calculating coordinates of the measurement-use point representing a position in a coordinate space by using the plurality of captured images, the coordinate space being a three-dimensional space; and
calculating, in each of the divided areas, a length of a line segment between an intersection point of a perpendicular line and the measurement-use point, the perpendicular line passing through the measurement-use point and the baseline and is perpendicular to the baseline, by using the calculated coordinates of the measurement-use point and coordinates of the baseline in the coordinate space; and
calculating a length to be measured on the object by adding the length of the line segment calculated in each divided area.

* * * * *